(12) United States Patent
Doran et al.

(10) Patent No.: US 11,172,617 B2
(45) Date of Patent: Nov. 16, 2021

(54) CROP HANDLING APPARATUS FOR SAVING AND DRYING FODDER CROPS

(71) Applicant: Acres Machinery Limited, Roscommon (IE)

(72) Inventors: David Doran, Roscommon (IE); Mark Doran, Roscommon (IE)

(73) Assignee: Acres Machinery Limited, Roscommon (IE)

( * ) Notice: Subject to any disclaimer, the term of this patent is extended or adjusted under 35 U.S.C. 154(b) by 185 days.

(21) Appl. No.: 16/310,637

(22) PCT Filed: Jun. 19, 2017

(86) PCT No.: PCT/EP2017/064978
§ 371 (c)(1),
(2) Date: Dec. 17, 2018

(87) PCT Pub. No.: WO2017/216389
PCT Pub. Date: Dec. 21, 2017

(65) Prior Publication Data
US 2019/0343049 A1    Nov. 14, 2019

(30) Foreign Application Priority Data

Jun. 17, 2016   (IE) ................................. S2016/0163

(51) Int. Cl.
*A01D 78/06*    (2006.01)
*A01B 63/00*    (2006.01)
*A01D 78/00*    (2006.01)

(52) U.S. Cl.
CPC ............ *A01D 78/06* (2013.01); *A01B 63/008* (2013.01); *A01D 78/006* (2013.01); *A01D 78/002* (2013.01); *A01D 78/003* (2013.01)

(58) Field of Classification Search
CPC .... A10D 78/06; A10D 78/006; A10D 78/002; A10D 78/003; A10D 82/00; A01B 63/008
See application file for complete search history.

(56) References Cited

U.S. PATENT DOCUMENTS 1,877,770 A * 9/1932 Larson .................. A01D 78/02
56/12.4
2,694,895 A * 11/1954 Gronlund ............... A01D 78/06
56/376

(Continued)

FOREIGN PATENT DOCUMENTS

DE      2927297 A1 *  1/1980    ............ A01D 78/06
EP      2384615 A1 * 11/2011    ............ A01D 78/04

(Continued)

OTHER PUBLICATIONS

Lang, D., Search Report and Written Opinion for PCT/EP2017/064978, dated Oct. 2, 2017, 9 pages.

*Primary Examiner* — Arpad Fabian-Kovacs
(74) *Attorney, Agent, or Firm* — LaBatt, LLC

(57) ABSTRACT

A crop handling apparatus comprises a mobile chassis. The chassis is mounted on ground-engaging wheels. A tow-bar is provided at a front of the chassis for releasable attachment to a towing vehicle such as a tractor. A crop conditioning rotor is mounted on the chassis and has a plurality of outwardly projecting radial tines. Drive for the crop conditioning rotor can be by way of a drive transmission on the chassis which connects via a drive input with a PTO shaft on a tractor behind which the crop handling apparatus is drawn in use. A crop gathering conveyor is mounted on the chassis in front of the crop conditioning rotor. The crop gathering conveyor has a discharge end located in front of an inlet of the crop conditioning rotor to feed crop material to the inlet of the crop conditioning rotor in use.

16 Claims, 8 Drawing Sheets

(56) References Cited

U.S. PATENT DOCUMENTS

| | | | | |
|---|---|---|---|---|
| 2,727,348 | A | | 12/1955 | Arend |
| 2,731,782 | A | * | 1/1956 | Mason ............... A01F 15/00 56/11.9 |
| 3,125,845 | A | * | 3/1964 | Lee ................. A01D 78/14 56/364 |
| 4,768,333 | A | * | 9/1988 | Reber ............... A01D 78/02 56/370 |
| 4,785,614 | A | * | 11/1988 | Schoenherr ......... A01D 78/142 56/365 |
| 5,127,217 | A | | 7/1992 | Fell et al. |
| 6,164,051 | A | * | 12/2000 | van der Lely ....... A01D 57/20 56/367 |
| 7,418,811 | B2 | * | 9/2008 | Hironimus .......... A01D 84/00 56/354 |
| 8,166,739 | B2 | * | 5/2012 | Dow ................ A01D 84/00 56/192 |
| 2010/0154662 | A1 | | 6/2010 | Fukayo |
| 2014/0090347 | A1 | | 4/2014 | Peden |

FOREIGN PATENT DOCUMENTS

| | | | | |
|---|---|---|---|---|
| EP | 2436259 | A1 | | 4/2012 |
| EP | 3025577 | A1 * | 6/2016 | ............ A01D 78/06 |
| GB | 846901 | | | 8/1960 |
| GB | 2141314 | A * | 12/1984 | ............ A01D 84/00 |
| GB | 2173383 | A * | 10/1986 | ............ A01D 57/12 |
| GB | 2534121 | A * | 7/2016 | ........... A01D 78/006 |

* cited by examiner

CROP HANDLING APPARATUS FOR SAVING AND DRYING FODDER CROPS

INTRODUCTION

This invention relates to the saving and drying of crops, and in particular fodder crops such as silage, hay and straw before it is baled or harvested.

BACKGROUND OF THE INVENTION

In current practice a farmer will cut a crop of silage or hay using a mower. Then, typically several hours later, the farmer spreads out the grass using another machine called a tedder. This is done to allow the crop to wilt and achieve the correct moisture content before gathering the crop. Again, typically several hours later, the farmer will gather the spread out grass into rows for picking up by a harvester or baler. This may be done using a rake. If the moisture content is still not acceptable, for example if drying conditions are poor, or it has been raining then the farmer will generally use a conditioner machine to pass through the rows or swathes again before picking up by the baler or harvester. It will be appreciated that this crop handling process requires a number of specialised machines, involving considerable capital cost, and also involves considerable man hours and running costs in carrying out the various stages in the crop conditioning process.

It is an object of the present invention to provide an improved crop handling apparatus which is more flexible and versatile and can carry out a more diverse range of crop handling operations with a view to reducing the capital cost and time and running costs involved in this type of crop handling process.

SUMMARY OF THE INVENTION

According to the invention there is provided a crop handling apparatus, including:
  a chassis;
  the chassis being mounted on ground-engaging wheels;
  a towbar at a front of the chassis for releasable attachment to a towing vehicle;
  a crop conditioning rotor mounted on the chassis;
  drive means for the crop conditioning rotor on the chassis; and
  a crop gathering conveyor mounted on the chassis in front of the crop conditioning rotor, said crop gathering conveyor having a discharge end located in front of an inlet of the crop conditioning rotor to feed crop material to the inlet of the crop conditioning rotor.

In one embodiment of the invention the crop gathering conveyor has a pair of conveyors, said conveyors being mounted at opposite sides of the inlet to the crop conditioning rotor, each conveyor extending forwardly and outwardly from the inlet to the crop conditioning rotor to funnel crop material inwardly towards the inlet of the crop conditioning rotor in use.

In another embodiment of the invention each conveyor is movable on the chassis between a lowered in-use position on the chassis and a raised stored position on the chassis.

In another embodiment of the invention each conveyor is mounted on the chassis by a support arm, the support arm being pivotally movable on the chassis for moving the conveyor between the lowered position and the raised position on the chassis.

In another embodiment of the invention a ram is mounted between the chassis and the support arm for pivotal movement of the support arm on the chassis.

In another embodiment of the invention each conveyor is connected intermediate its ends to the support arm by means of swivel mount for swiveling of the conveyor about a transverse axis of the conveyor.

In another embodiment of the invention each conveyor has ground-engaging wheels.

In a further embodiment of the invention the conveyor wheels are attached to the swivel mount.

In another embodiment of the invention each conveyor comprises a linear rake.

In another embodiment of the invention the rake comprises an elongate mounting frame on which are rotatably mounted a pair of spaced-apart rollers, an endless belt mounted between the rollers, a plurality of spaced-apart tines mounted on and projecting outwardly from the endless belt.

In another embodiment of the invention the tines are arranged in pairs on the belt and the plane of the belt is angled relative to the ground in use such that for each pair of tines one tine is positioned above the other tine.

In another embodiment of the invention the crop gathering conveyor is mounted on a support frame which is detachably mounted on the chassis.

In another embodiment of the invention a pair of tedder reels is mounted on the chassis at a rear end of the chassis, the tedder reels carried on a support arm which is pivotally mounted on the chassis and movable by means of a ram to raise and lower the support arm on the chassis for movement of the tedder reels between a raised stored position on the chassis and a lowered operative position on the chassis.

In another embodiment of the invention the chassis wheels are height adjustable to raise and lower the crop conditioning rotor relative to the ground in use.

In another embodiment of the invention the crop handling apparatus includes crop monitoring apparatus for collecting pre-set desirable crop monitoring and nutritional information when handling the crop.

In another embodiment of the invention the crop handling apparatus includes at least one sensor for determining the moisture content of a crop gathered by the crop handling apparatus in use.

In another embodiment of the invention the endless belt comprises a pair of spaced-apart endless belts mounted between the rollers, each pair of tines being mounted on a bracket spanning between the belts.

In another embodiment of the invention the support arm for the tedder reels is telescopically length adjustable.

In another embodiment of the invention the chassis wheels are mounted on trailing arms which are pivotally mounted on the chassis.

In another aspect the invention provides a demountable rake assembly comprising the rake support frame with at least one rake conveyor mounted thereon, and attachment means for demountably securing the rake support frame at a front of a tractor or on the chassis of the crop handling apparatus.

In a further aspect the invention provides a method for collecting a fodder crop which includes the step of collecting preset desirable crop monitoring and nutritional information when collecting the crop.

In another embodiment of the invention the method includes measuring the moisture content of the crop as it is being collected.

BRIEF DESCRIPTION OF THE DRAWINGS

The invention will be more clearly understood by the following description of some embodiments thereof, given by way of example only with reference to the accompanying drawings, in which.

DETAILED DESCRIPTION OF THE PREFERRED EMBODIMENTS

Figure 1:
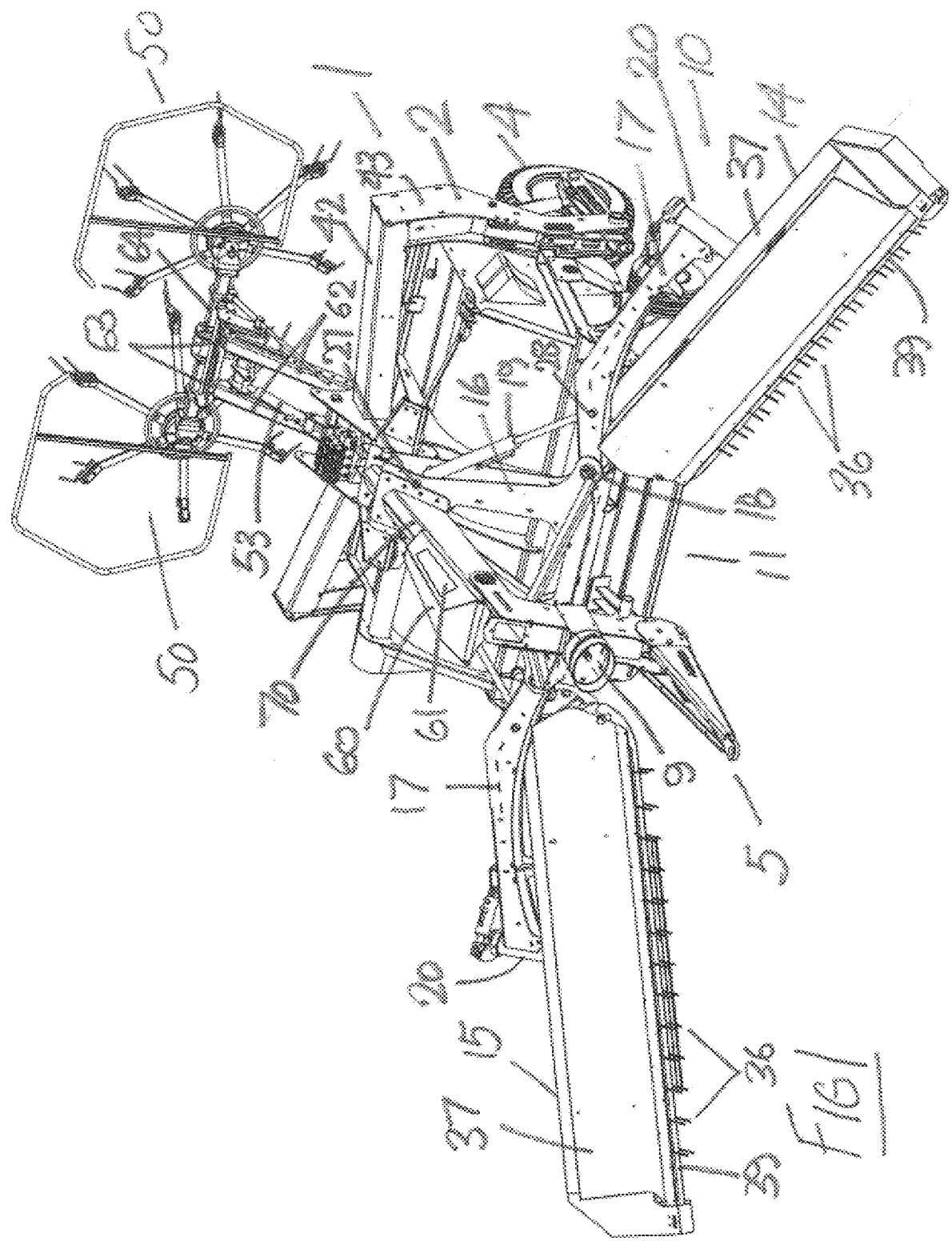
FIG. 1 is a front perspective view of a crop handling apparatus according to the invention.

Referring to the drawings, there is illustrated a crop handling apparatus according to the invention indicated generally by the reference numeral 1. The crop handling apparatus 1 comprises a mobile chassis 2. The chassis 2 is mounted on ground-engaging wheels 4. A towbar 5 is provided at a front of the chassis 2 for releasable attachment to a towing vehicle such as a tractor. A crop conditioning rotor 7 (best seen in FIG. 3) is mounted in a horizontal position on the chassis 2 and has a plurality of outwardly projecting radial tines 8. Drive for the crop conditioning rotor 7 is by way of a drive transmission on the chassis 2 which connects via a drive input 9 with a PTO shaft on a tractor behind which the crop handling apparatus 1 is drawn in use. A crop gathering conveyor indicated generally by the reference numeral 10 is mounted on the chassis 2 in front of the crop conditioning rotor 7. The crop gathering conveyor 10 has an inner discharge end 11 located in front of an inlet of the crop conditioning rotor 7 at a front of the crop conditioning rotor 7 to feed crop material to the inlet of the crop conditioning rotor 7 in use.

The crop gathering conveyor 10 comprises a pair of rake conveyors 14, 15 mounted at opposite sides of the inlet to the crop conditioning rotor 7. Each rake conveyor 14, 15 extends forwardly and outwardly from the inlet to the crop conditioning conveyor 7 to funnel crop material inwardly towards the inlet of the crop conditioning rotor 7 in use.

Each rake conveyor 14, 15 is mounted on a rake support frame 16 on the chassis 2 by means of a support arm 17 which is pivotally movable on the rake support frame 16 for moving each rake conveyor 14, 15 between a lower in-use position as shown in FIG. 1 and a raised stored position on the chassis 2. Each support arm 17 is pivotally mounted at an inner end by means of a pivot pin 18 to the rake support frame 16. A ram 19 is mounted between the rake support frame 16 and the support arm 17, this ram 19 being operable to raise and lower the rake conveyor 14, 15 on the chassis 2. The ram 19 is attached to the rake support frame 16 and to the support arm 17 by pivot mounts 27, 28.

Figure 3:
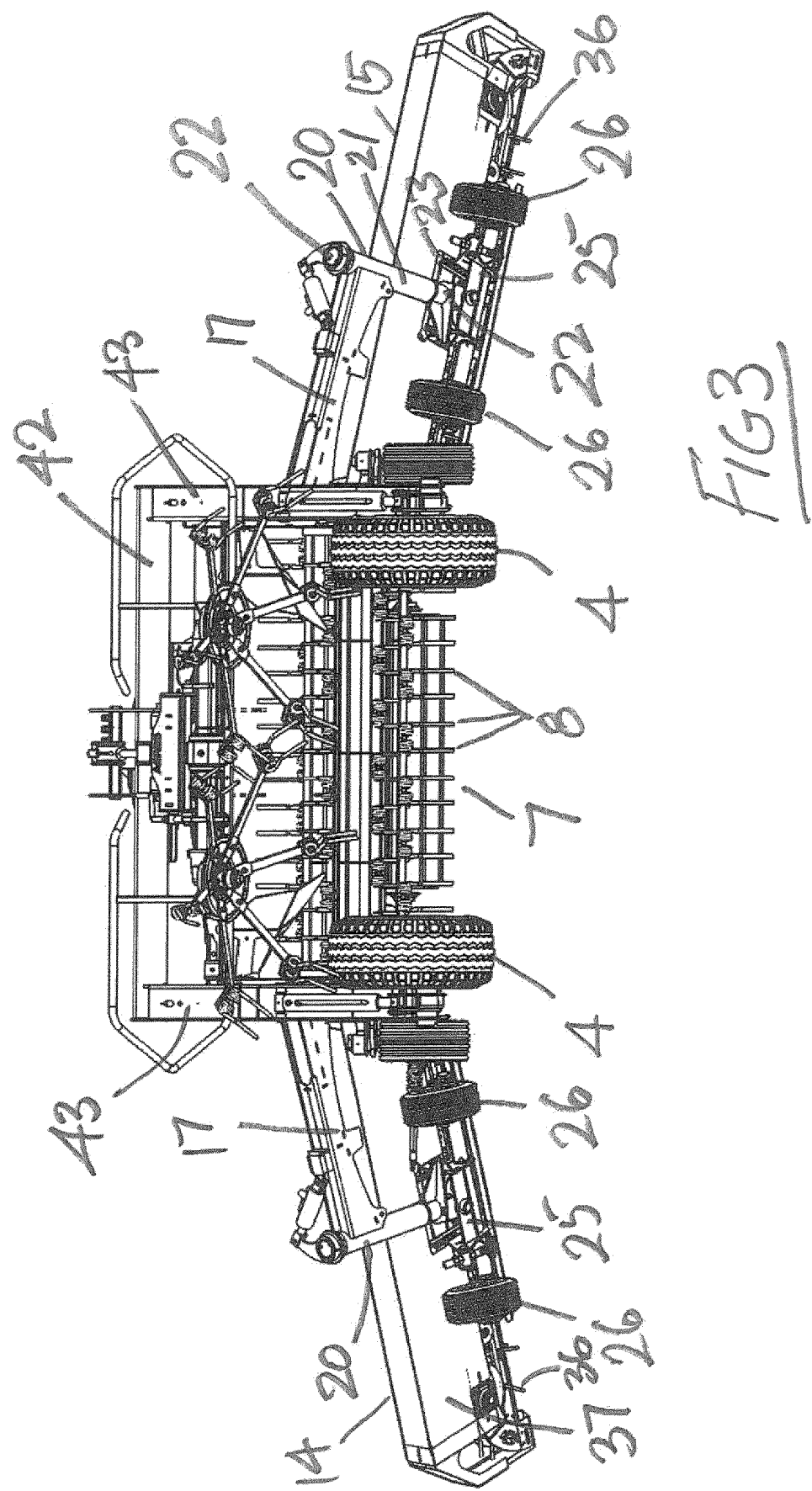
FIG. 3 is a rear elevational view of the crop handling apparatus.

Referring in particular to FIG. 3, a swivel mount 20 is provided at an outer end of each support arm 17. Each swivel mount 20 has a tubular housing 21 attached to the support arm 17. A swivel shaft 22 is rotatably mounted within the housing 21 and is attached at its lower end by a mounting plate 23 to the associated rake conveyor 14, 15 intermediate the ends of the rake conveyor 14, 15. An axle 25 with a pair of rake support wheels 26 is also attached to the mounting plate 23 to provide support for the rake conveyor 14, 15 when it is in the extended in-use position.

Figure 7:
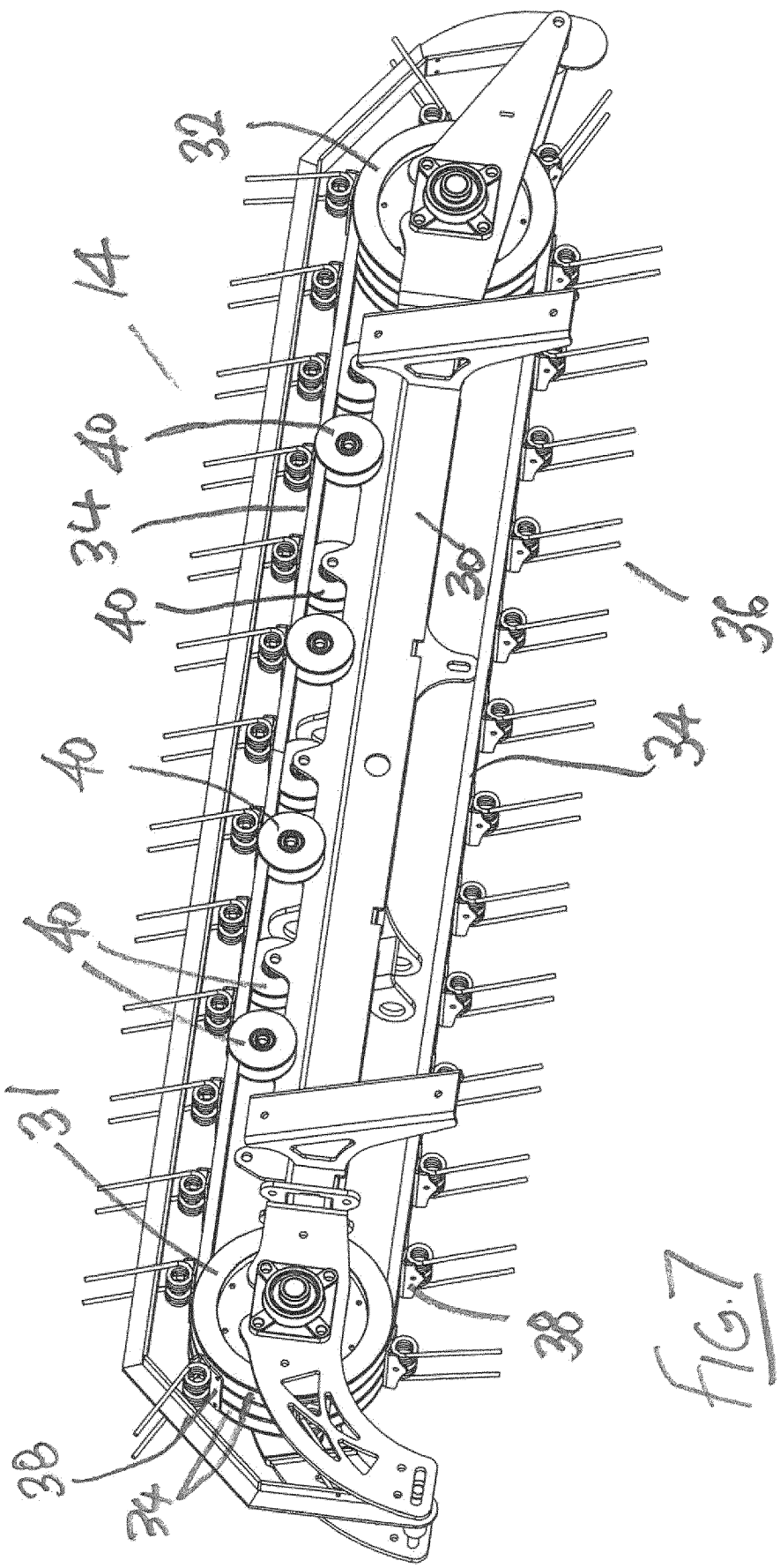
FIG. 7 is an enlarged perspective detail cut-away view of a rake of the rake assembly.
Figure 8:
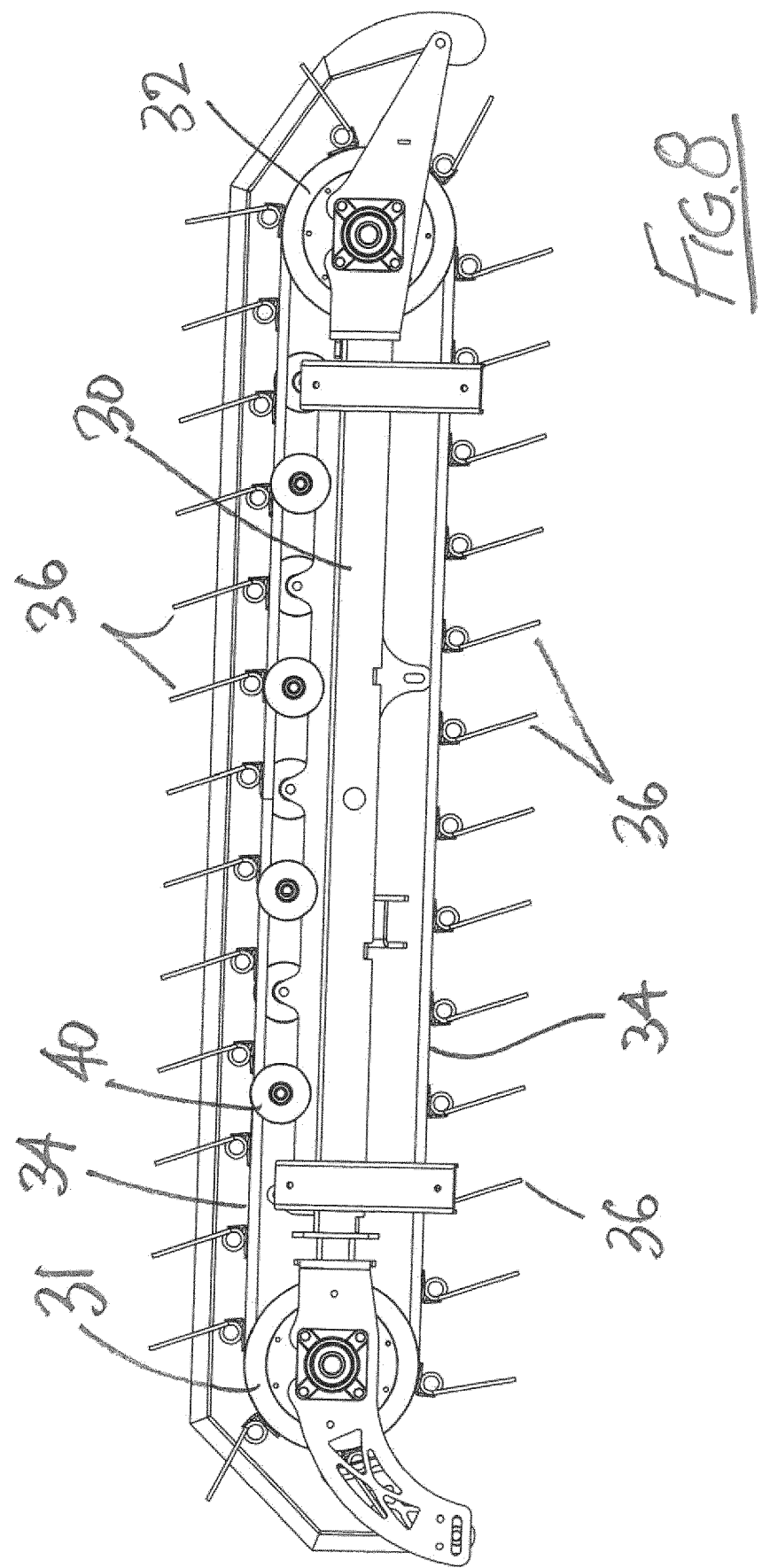
FIG. 8 is an elevational view of the rake shown in FIG. 7.

Referring in particular to FIG. 7 and FIG. 8 each rake conveyor 14, 15 comprises an elongate mounting frame 30 on which are rotatably mounted a pair of spaced-apart rollers 31, 32. At least one of these rollers 31, 32 is a drive roller powered from the tractor PTO, or by an hydraulic motor. An endless belt, in this case formed by an associated pair of belts 34 is mounted between the rollers 31, 32. A plurality of spaced-apart tines 36 are mounted on and project outwardly from the belts 34, pairs of tines 36 being secured on the belts 34 by a mounting bracket 38 which spans between the belts 34. Rotatably mounted at a top of the mounting frame 30 are a number of intermediate belt support rollers 40 which support the upper portions of the belts 34 as they pass between the rollers 31, 32.

It will be noted that the tines 36 are arranged in pairs on the belts 34 and in use the mounting frame 30 is tilted such that the plane of the belt 34, that is a plane passing through a top portion and a bottom portion of the belt 34, is angled relative to the ground in use so that for each pair of tines 36, one tine 36 is positioned above the other tine 36. In this manner the uppermost tine 36 conveys the bulk crop material inwardly and the lowermost tine 36 clears the ground. The angle at which the tines 36 are tilted is typically in the range 30° to 60°, and preferably about 45° to the ground. Each rake conveyor 14, 15 has an outer casing 37 attached to the mounting frame 30 to enclose the rollers 31, 32, 40 and belts 34 with a downwardly facing opening 39 for through passing of tines 36. It will be noted that each conveyor rake 14, 15 is angled forwardly on the chassis 2 to follow crop material inwardly towards the discharge 11 located in front of the inlet to the crop conditioning rotor 7. The angle of each conveyor rake 14, 15 is about 10° to 20° relative to a transverse axis of the chassis 2, depending on the crop, and typically will be about 20°.

With the hydraulic rams in float mode, each rake conveyor 14, 15 can swivel and rise up and down to follow the contour of the ground over which the crop handling apparatus 1 is drawn in use.

A crop intake roller 41 is rotatably mounted on the rake support frame 16 immediately behind and extending across the discharge end 11 of the rake conveyors 14, 15 and in front of the crop conditioning rotor 7. The crop intake roller 41 is supported between a pair of spaced-apart downwardly extending hanger plates 35 on the rake support frame 16 for rotation about a horizontal axis. An upper end of each hanger plate 35 engages an inclined slide 49 for sliding the hanger plate 35 on the rake support frame 16 to adjust the height of the crop intake roller 41 relative to the ground.

Figure 5:
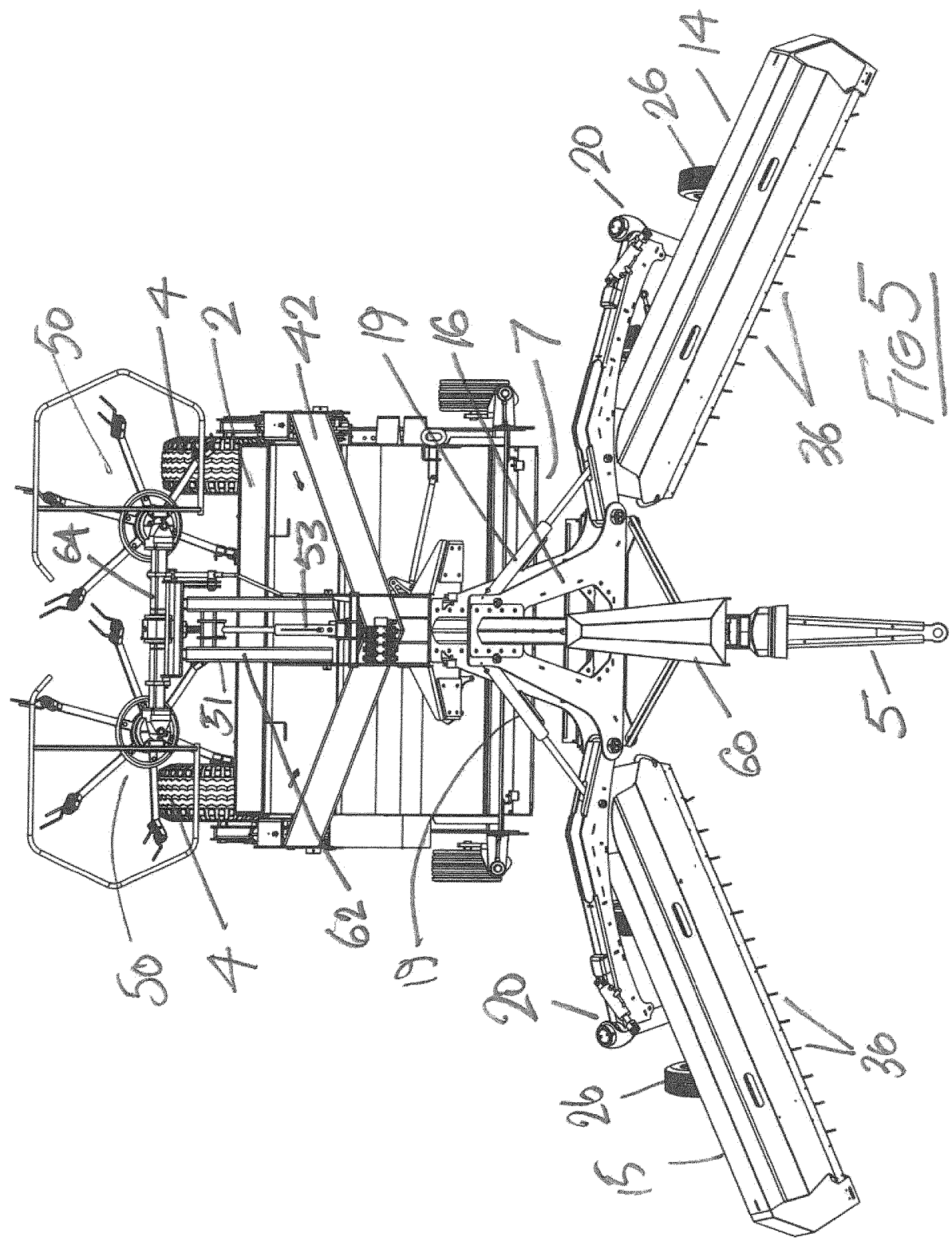
FIG. 5 is a plan view of the crop handling apparatus.

The chassis 2 has a top crossbar 42. It will be noted from FIG. 5, the generally horizontal crossbar 42 has a forwardly pointing V-shape. The rake support frame 16 is at the mounted front and centre of the crossbar 42. Cranked legs 43 depend downwardly at each side of the crossbar 42. A trailing arm 44 is mounted by a pivot 45 at a bottom of each leg 43. A wheel 4 is rotatably mounted at a free outer end 46 of the trailing arm 44. A wheel height adjusting ram 47 extends between pivot mounts 48 on the leg 43 and on the trailing arm 44. This ram 47 is operable to vertically adjust the height of the chassis 2, and thus the crop conditioning rotor 7, relative to the ground.

Each leg 43 has an upper leg portion 54 extending downwardly from the crossbar 42, a forwardly inclined intermediate leg portion 55 extending from a bottom of the upper portion 54 to a top of a lower leg portion 56 which extends downwardly from the intermediate leg portion 55. An upper ram pivot mount 48 is attached to the intermediate portion 55. The trailing arm 44 pivot 45 is located at a bottom of the lower portion 56.

Side arms 57 extend forwardly of each leg 43. Castor wheels 58 are swivel mounted at a front end of each side arm 57. The crop conditioning rotor 7 is mounted within a downwardly open casing 59 on the chassis 2.

A pair of tedder reels 50 is mounted on the chassis 2 at a rear end of the chassis 2 on the crossbar 42. The tedder reels 50 are carried on a support arm 51 which projects rearwardly on the chassis 2 and is centrally mounted on the crossbar 42. A ram 53 mounted between the arm 51 and the chassis 2 is operable to raise and lower the arm 51 and hence the tedder reels 50 on the chassis 2 for movement between a raised stored position on the chassis and a lowered operative position on the chassis 2. The arm 51 is telescopic and has a pair of spaced-apart inner sleeves 62 pivotally mounted at their inner ends to the crossbar 42. An associated telescopic arm 63 slides within each sleeve 62. An outer end of each telescopic arm 63 attaches to and supports a transverse rail 64, perpendicular to the telescopic arms 63, and having a tedder reel 50 rotatably mounted at each end of the rail 64.

Figure 2:
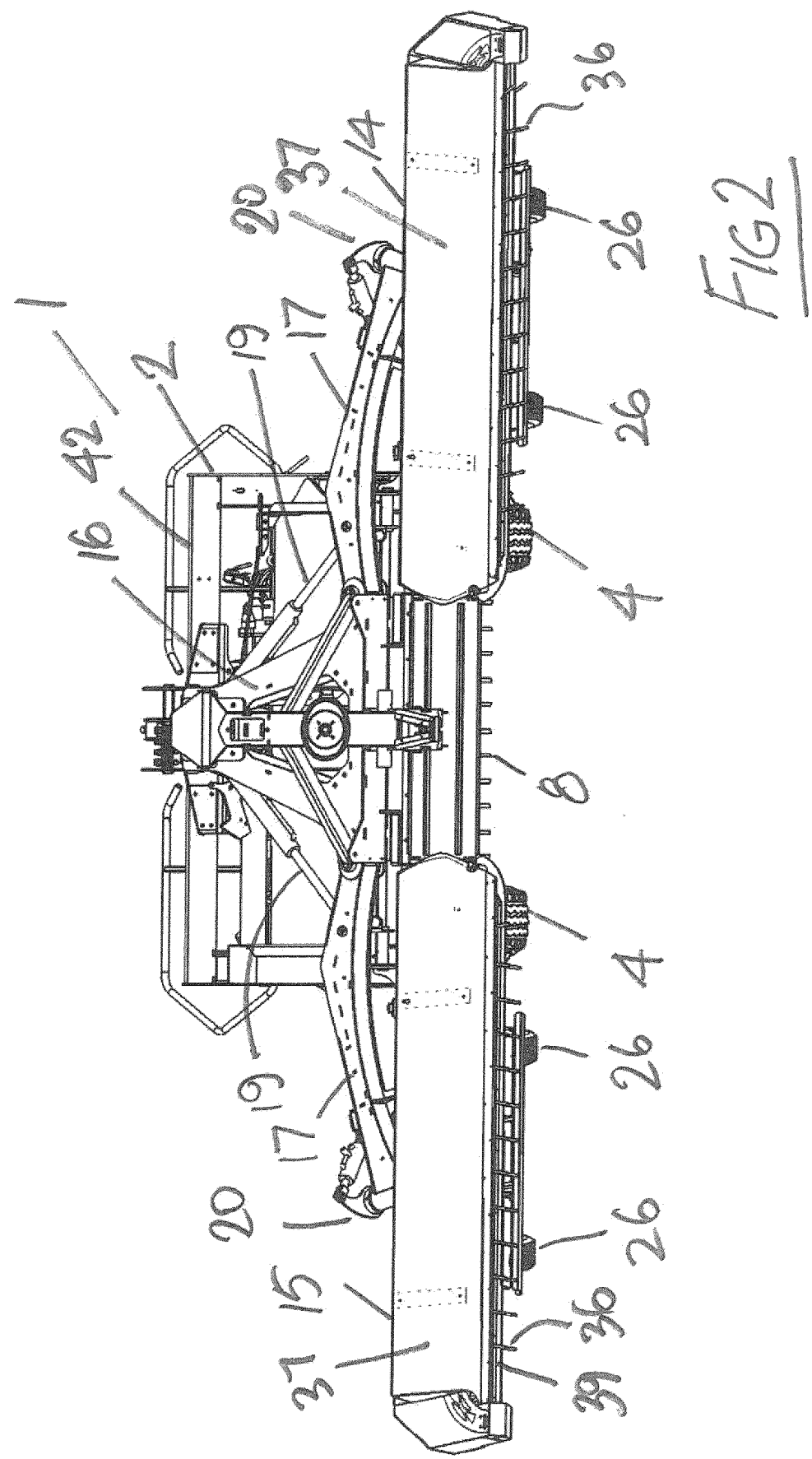
FIG. 2 is a front elevational view of the crop handling apparatus.
Figure 4:
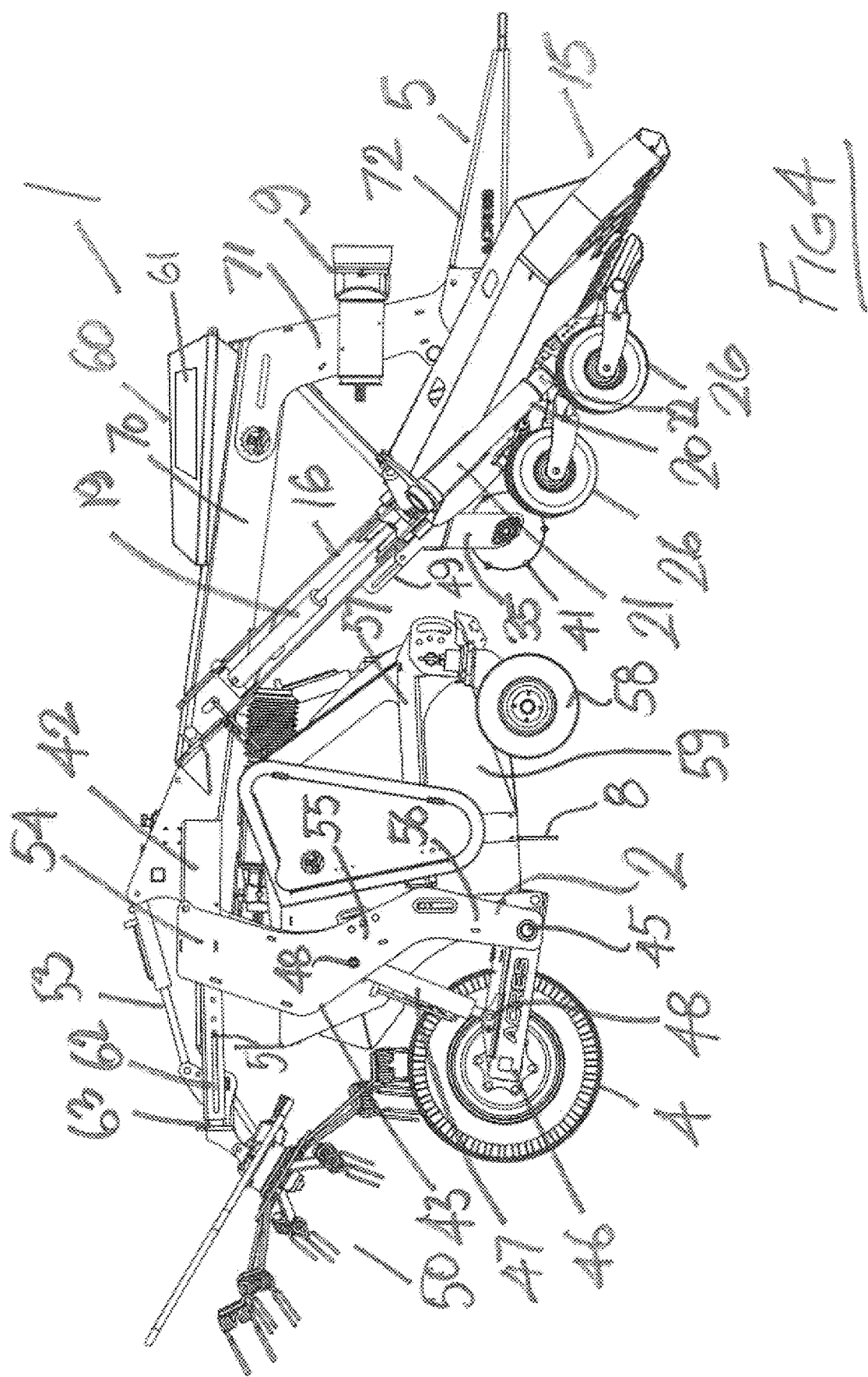
FIG. 4 is a side elevational view of the crop handling apparatus.

Referring in particular to FIG. 2 and FIG. 4, the towbar 5 has a Z-shape with a top beam 70 attached at a centre of the crossbar 42 of the chassis 2 and extending forwardly therefrom (or strictly speaking, as shown in the drawings, attached to the top of the rake support frame 16 which is attached to the centre of the crossbar 42). An intermediate beam 71 extends downwardly at a forward end of the top beam 70. A forwardly projecting lower beam 72 projects outwardly at a bottom end of the intermediate beam 71 terminating in a towing eye.

A control box 60 is mounted on the chassis 2, on the top beam 70 of the towbar 5, and contains crop monitoring apparatus 61 for collecting crop monitoring and nutritional information when handling a crop. This information may be collected and stored using any suitable recording device for subsequent retrieval. Alternatively, or in addition, the crop monitoring apparatus 61 may have means for transmitting the information directly to a remote station in a farmhouse or the like. Various data is collected relating to the crop such as the moisture content, location, weather, time, etc. which can later be used for traceability purposes and also for estimating the nutritional content of the crop. Moisture content is particularly important in affecting the nutritional value of the crop and can later be used for preparing a composite feed of a desired nutritional value incorporating the crop for optimum feeding of cattle or other livestock.

Figure 6:
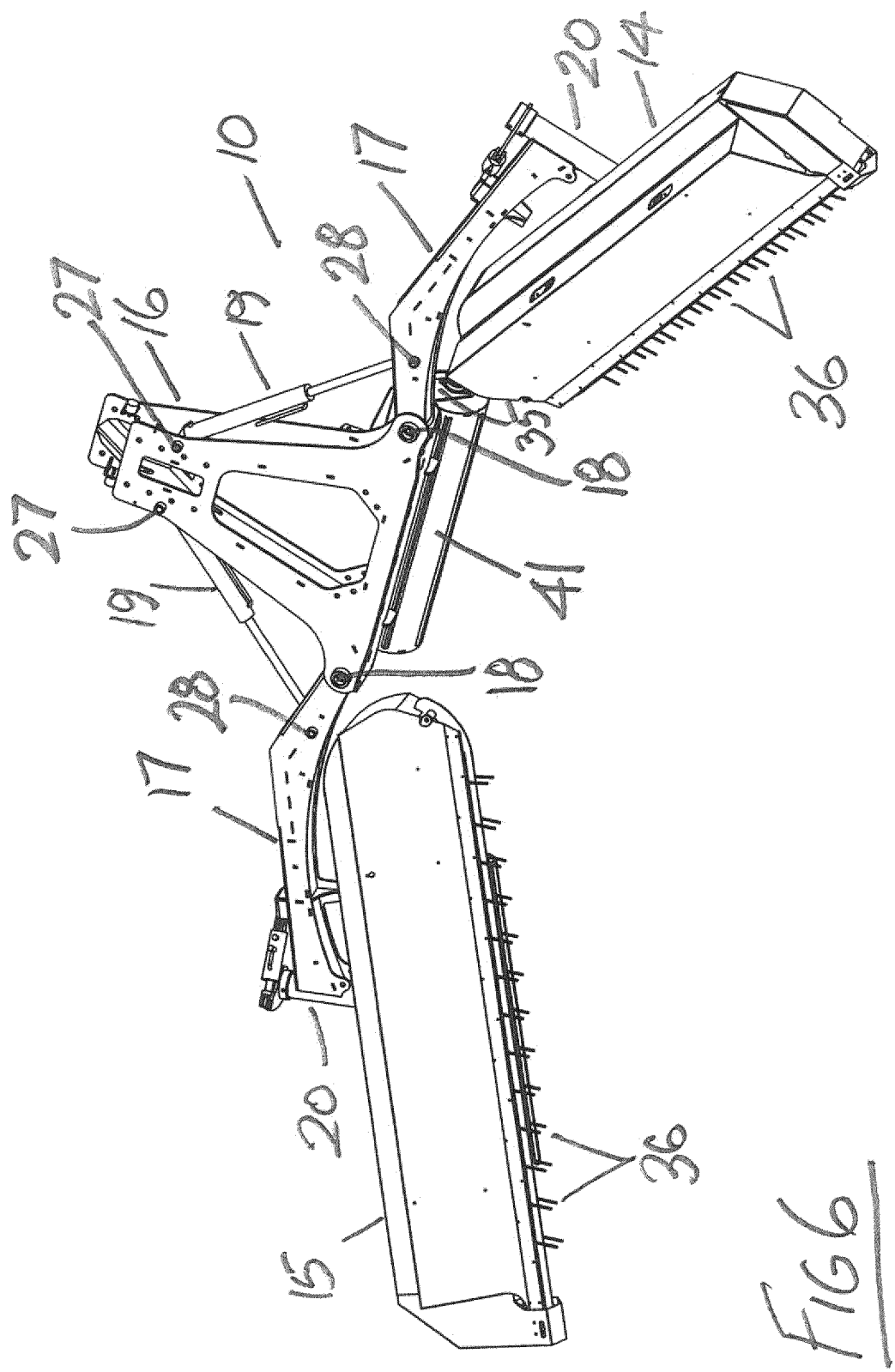
FIG. 6 is a detail perspective view of a rake assembly of the crop handling apparatus.

Referring in particular to FIG. 1 and FIG. 6, it will be noted that the crop gathering conveyor 10 comprising the rake support frame 16 with rake conveyors 14, 15 is detachably mounted on the chassis 2. This provides additional flexibility in use. For example, the rake assembly can be detached from the chassis 2 and mounted on the front linkage of the tractor as a separate machine for the likes of using a baler behind the tractor (eliminating a second tractor and driver).

In use, with the rakes 14, 15 in the lowered in-use position, as the apparatus 1 is towed behind a tractor or the like vehicle, the rakes 14, 15 direct the crop material inwardly to an inlet of conditioning rotor 7 for conditioning and discharging the crop at the rear of the chassis 2 in a perfectly shaped and conditioned swath. In doing this the crop can continue the crop drying process allowing the air flow through the swath for a further period of time before collection by a baler or harvester. Typically, this will eliminate the need for a tedding out process saving a considerable amount of time and costs. If, after a period of bad weather, the crop requires further drying due to rain or the like, the swathes can either be conditioned again by the conditioning rotor 7 with the rakes 14, 15 in the raised position, or, if required, spread out for drying by lowering the rear mounted tedder reels 50.

It will be appreciated that instead of using rakes to feed crop material to the conditioning rotor, alternative types of crop feeder might be used. For example, one or more conveyors with associated pick-up tines to feed crop material onto the conveyor for delivery to the conditioning rotor might be used. This could advantageously provide a longer reach with fewer passes required to collect a crop.

Advantageously the crop handling apparatus of the invention provides a single link between a mower and a baler which is capable of raking, conditioning and tedding as required. Also, crop information can be collected which is useful from a traceability point of view, but perhaps more importantly facilitating preparation of animal feed of optimum nutritional value using the saved crop.

In the specification the terms "comprise, comprises, comprised and comprising" or any variation thereof and the terms "include, includes, included and including" or any variation thereof are considered to be totally interchangeable and they should all be afforded the widest possible interpretation and vice versa.

The invention is not limited to the embodiments hereinbefore described which may be varied in both construction and detail with the scope of the appended claims.

The invention claimed is:

1. A crop handling apparatus, including:
a chassis;
the chassis being mounted on ground-engaging wheels;
a towbar at a front of the chassis for releasable attachment to a towing vehicle;
a crop conditioning rotor mounted on the chassis;
drive means for the crop conditioning rotor on the chassis; and
a crop gathering conveyor mounted on the chassis in front of the crop conditioning rotor, said crop gathering conveyor having a discharge end located in front of an inlet of the crop conditioning rotor to feed crop material to the inlet of the crop conditioning rotor,
wherein the crop gathering conveyor has a pair of conveyors, said conveyors being mounted at opposite sides of the inlet to the crop conditioning rotor, each conveyor extending forwardly and outwardly from the inlet to the crop conditioning rotor to funnel crop material inwardly towards the inlet of the crop conditioning rotor in use,
a crop intake roller rotatably mounted across the discharge end of the crop gathering conveyor in front of the crop conditioning rotor, the crop intake roller rotatable about a horizontal axis.

2. The crop handling apparatus as claimed in claim 1 wherein the conveyors of the crop gathering conveyor are rake conveyors, each rake conveyor being mounted on a rake support frame on the chassis by means of a support arm which is pivotally movable on the rake support frame for moving each rake conveyor between a lower in-use position and a raised stored position on the chassis, each support arm being pivotally mounted at an inner end by means of a pivot pin to the rake support frame, a ram being mounted between the rake support frame and the support arm, the ram being operable to raise and lower the rake conveyor on the chassis.

3. The crop handling apparatus as claimed in claim 2 wherein the crop intake roller is rotatably mounted on the rake support frame immediately behind and extending across the discharge end of the rake conveyors and in front of the crop conditioning rotor, the crop intake roller being supported between a pair of spaced-apart downwardly extending hanger plates on the rake support frame for rotation about a horizontal axis, an upper end of each hanger plate engaging an inclined slide which allows the hanger plate to slide on the rake support frame to adjust the height of the crop intake roller relative to the ground.

4. The crop handling apparatus as claimed in claim 2 wherein each conveyor is connected intermediate its ends to the support arm by means of a swivel mount for swiveling of the conveyor about a transverse axis of the conveyor, the swivel mount being provided at an outer end of the support arm, the swivel mount having a tubular housing attached to the support arm, a swivel shaft rotatably mounted within the housing and attached at its lower end by a mounting plate to the associated rake conveyor intermediate the ends of the rake conveyor, an axle with a pair of rake support wheels attached to the mounting plate to provide support for the rake conveyor when it is in the lowered in-use position.

5. The crop handling apparatus as claimed in claim 1 wherein each conveyor comprises a linear rake.

6. The crop handling apparatus as claimed in claim 5 wherein the rake comprises an elongate mounting frame on which are rotatably mounted a pair of spaced-apart rollers, an endless belt mounted between the rollers, a plurality of spaced-apart tines mounted on and projecting outwardly from the endless belt.

7. The crop handling apparatus as claimed in claim 6 wherein the tines are arranged in pairs on the belt and the plane of the belt is angled relative to the ground in use such that for each pair of tines one tine is positioned above the other tine.

8. The crop handling apparatus as claimed in claim 1 wherein the crop gathering conveyor is mounted on a support frame which is detachably mounted on the chassis.

9. The crop handling apparatus as claimed in claim 1 wherein a pair of tedder reels is mounted on the chassis at a rear end of the chassis, the tedder reels carried on a support arm which is pivotally mounted on the chassis and movable by means of a ram to raise and lower the support arm on the chassis for movement of the tedder reels between a raised stored position on the chassis and a lowered operative position on the chassis.

10. The crop handling apparatus as claimed in claim 1 wherein the chassis wheels are height adjustable to raise and lower the crop conditioning rotor relative to the ground in use.

11. The crop handling apparatus as claimed in claim 1 wherein the crop handling apparatus includes crop monitoring apparatus for collecting pre-set desirable crop monitoring and nutritional information when handling the crop.

12. The crop handling apparatus as claimed in claim 6 wherein the endless belt comprises a pair of spaced-apart endless belts mounted between the rollers, each pair of tines being mounted on a bracket spanning between the belts.

13. The crop handling apparatus as claimed in claim 9, wherein the support arm for the tedder reels is telescopically length adjustable.

14. The crop handling apparatus as claimed in claim 1, wherein the chassis wheels are mounted on trailing arms which are pivotally mounted on the chassis.

15. A crop handling apparatus, including:
a chassis;
the chassis being mounted on ground-engaging wheels;
a towbar at a front of the chassis for releasable attachment to a towing vehicle;
a crop conditioning rotor mounted on the chassis;
drive means for the crop conditioning rotor on the chassis; and
a crop gathering conveyor mounted on the chassis in front of the crop conditioning rotor, said crop gathering conveyor having a discharge end located in front of an inlet of the crop conditioning rotor to feed crop material to the inlet of the crop conditioning rotor,
wherein a pair of tedder reels is mounted on the chassis at a rear end of the chassis, the tedder reels carried on a support arm which is pivotally mounted on the chassis and movable by means of a ram to raise and lower the support arm on the chassis for movement of the tedder reels between a raised stored position on the chassis and a lowered operative position on the chassis.

16. A crop handling apparatus, including:
a chassis;
the chassis being mounted on ground-engaging wheels;
a towbar at a front of the chassis for releasable attachment to a towing vehicle;
a crop conditioning rotor mounted on the chassis;
drive means for the crop conditioning rotor on the chassis; and
a crop gathering conveyor mounted on the chassis in front of the crop conditioning rotor, said crop gathering conveyor having a discharge end located in front of an inlet of the crop conditioning rotor to feed crop material to the inlet of the crop conditioning rotor,
wherein the crop gathering conveyor has a pair of conveyors, said conveyors being mounted at opposite sides of the inlet to the crop conditioning rotor, each conveyor extending forwardly and outwardly from the inlet to the crop conditioning rotor to funnel crop material inwardly towards the inlet of the crop conditioning rotor in use.

* * * * *